United States Patent [19]

Heffron

[11] Patent Number: 4,579,338

[45] Date of Patent: Apr. 1, 1986

[54] VIDEO GAME DEVICE WITH AUTOMATIC STANDBY MODE

[75] Inventor: Charles B. Heffron, Knoxville, Tenn.

[73] Assignee: North American Philips Consumer Electronics Corp., New York, N.Y.

[21] Appl. No.: 551,226

[22] Filed: Nov. 14, 1983

[51] Int. Cl.$^4$ ................................................ A63F 9/22
[52] U.S. Cl. ............................ 273/1 E; 273/DIG. 28; 358/903
[58] Field of Search ............ 273/1 E, DIG. 28, 85 G; 361/397, 412, 415; 339/17 LC; 365/63; 174/68.5; 358/903

[56] References Cited

U.S. PATENT DOCUMENTS 3,710,197 1/1973 Olds et al. .......................... 361/397
4,095,791 6/1978 Smith et al. ................. 273/DIG. 28

Primary Examiner—Richard C. Pinkham
Assistant Examiner—MaryAnn Stoll Lastova

Attorney, Agent, or Firm—Thomas A. Briody; William J. Streeter; Marianne Rich

[57] ABSTRACT

A video game device for use with a conventional television receiver includes microprocessor-based game control circuitry for generating audio and video signals in accordance with a series of digital instructions contained in a removable game cartridge. A signal provided by an RF generator within the game device is modulated by the audio and video signals to produce an RF output signal for application to the television receiver. A switch responsive to the presence of a game cartridge in the game unit supplies electrical power to the game control circuitry independently of power supplied to the RF generator. The switch reacts to disengaging movement of the game cartridge to remove power from the cartridge during such movement to prevent electrical damage to the cartridge and game control circuitry. Current continues to be supplied to the RF generator in the absence of the cartridge to prevent objectionable audio and video noise signals from appearing at the output of the television receiver.

4 Claims, 4 Drawing Figures

VIDEO GAME DEVICE WITH AUTOMATIC STANDBY MODE

BACKGROUND OF THE INVENTION

The present invention relates generally to electronic video game units having a digital processor which operates to display a video game on a television receiver in accordance with a set of instructions stored in a removable memory element.

Video game units, particularly those intended for use in the home, are normally adapted for use with conventional television receivers. Such video game units typically include microprocessor-based circuitry which electronically generates signals corresponding to the various backgrounds, moving characters and sound effects which make up a particular game. Within the game unit the microprocessor generated signals modulate a radio-frequency (RF) carrier to produce an RF output signal at a selected frequency channel similar to the signal transmitted by a conventional television broadcast station. When a signal thus generated by the video game unit is applied to the input terminals of a conventional television receiver tuned to the selected channel, the microprocessor generated signals appear as a game display on the television screen and corresponding sound effects are produced through the television receiver audio circuit.

Typically, in conventional home video game units different digital game programs can be provided to the microprocessor to create different game formats. Such instructions are contained in a video game memory element contained within a separate cartridge which can be removably inserted in the video game unit.

If a removable cartridge is inserted in a video game unit while the game unit is powered, it is possible for the resulting power surges and static discharges to damage the voltage sensitive digital circuitry of both the video game unit and the cartridge. In order to avoid the possibility of such damage, it is customary to instruct the user to disconnect power to the video game unit before a cartridge is inserted into or removed from the unit. However, when power is thus removed from the video game unit, the RF signal the unit normally produces is no longer generated. As modern television receivers are equipped with automatic gain control circuitry, the loss of the RF signal at the input terminal of the receiver causes the gain of the tuner and intermediate frequency amplifiers of the receiver to greatly increase. When this occurs, noise inherent in the tuner and intermediate frequency stages of the television receiver is greatly amplified and appears at the output of the receiver in the form of a bright video display and a loud hissing noise, which users often find objectionable. This causes some users to decrease the volume setting of the television receiver prior to removing power from the video game unit. Other users are induced to attempt changing cartridges while power remains applied to the game unit. At best, this results in inconvenience to the user, and at worst, the circuitry of the game unit and cartridge can be electrically damaged.

In view of the foregoing, it will be appreciated that to provide a video game unit wherein power is removed from the sensitive digital circuitry of the unit as game cartridges are interchanged. without resulting in the production of objectionable output by the television receiver, would constitute a marked improvement over conventional video game units.

SUMMARY OF THE INVENTION

The invention is generally directed to an electronic video game unit for producing an RF output signal for supplying audio and video information to a television receiver. Electronic game circuit means within the unit generate an audio signal and a video signal representing a particular video game in response to game instructions stored in a removable memory cartridge. RF signal generator means receive the audio and video signals from the game circuit means and generate the RF output signal. Power supply means provide power to drive the game circuit means and the RF generator means. First conductor means couple the power source to the signal means. Second conductor means couple the power source to the game circuit means. Included in the second conductor means are switch means for interrupting the power supplied to the game circuit means so that the game circuit means can be de-energized independently of the RF generator means.

BRIEF DESCRIPTION OF THE DRAWINGS

Features of the present invention which are believed to be novel are set forth with particularity in the appended claims. The invention, together with the further advantages thereof, can best be understood by reference to the following description taken in conjunction with the accompanying drawings and the several figures, in which like reference numerals identify like elements, and in which:

DESCRIPTION OF THE PREFERRED EMBODIMENT

Figure 1:
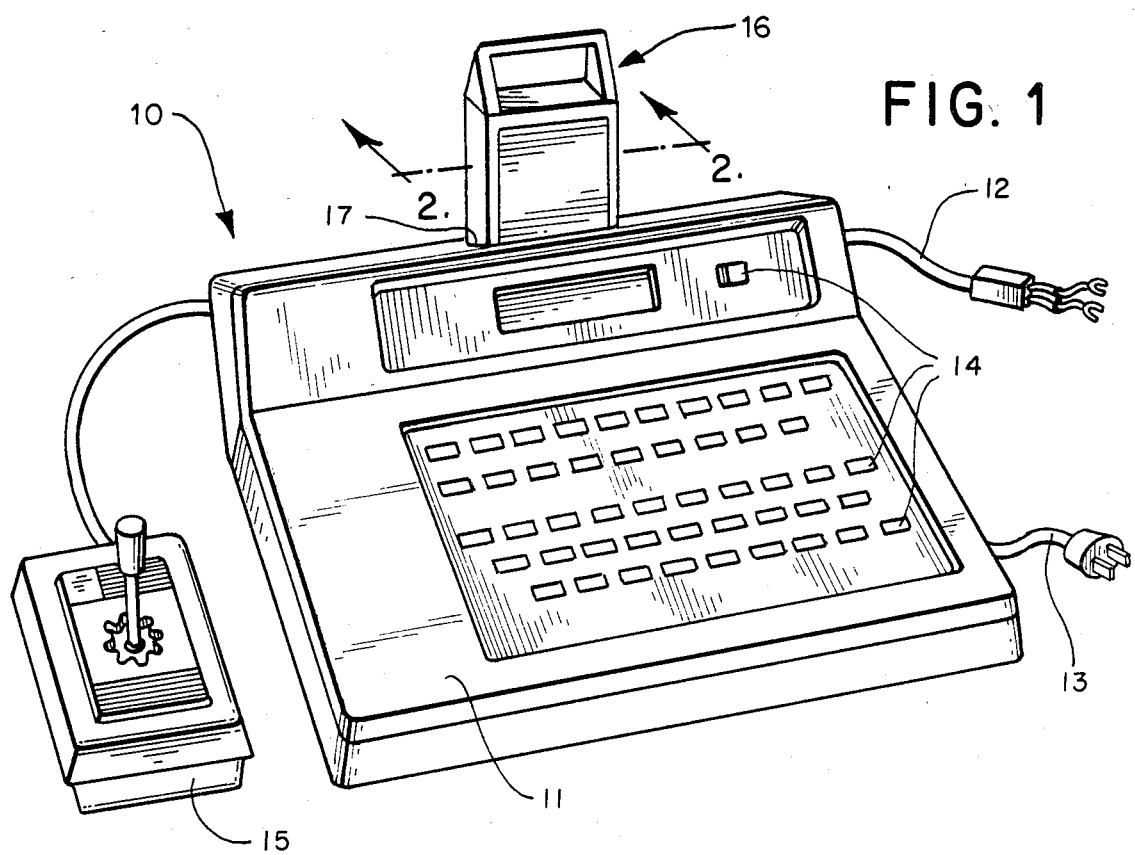
FIG. 1 is a perspective view of a video game unit having a plug-in game cartridge inserted therein.

Referring to the figures, and in particular to FIG. 1, an electronic video game unit 10 is illustrated. The video game unit 10 includes a generally rectangular housing 11 containing microprocessor-based circuitry for generating an RF output signal on a cable 12 for application to the input terminals of a conventional television receiver (not shown). Standard 120 VAC 60 Hz. electrical energy is supplied to the video game unit through a power cord 13 extending from the rear panel of the console. Various switches and keys 14 for controlling such functions as power on/off, game select and game reset are provided on the upper surface of the console. The video game unit may be provided with one or more user-actuable control stick assemblies 15 to facilitate user-input to the game program.

Typically, each video game program comprises a combination of display backgrounds, video characters, sound effects and game objectives. These elements are generated by the microprocessor-based digital game circuitry of the game unit in accordance with a set of digital instructions, or soft-ware, supplied to the game circuitry. Such digital instructions are typically supplied by means of a plug-in game cartridge 16 inserted manually by the user in a suitably dimensioned opening 17 (FIG. 2) provided in the upper surface of housing 12.

Figure 2:
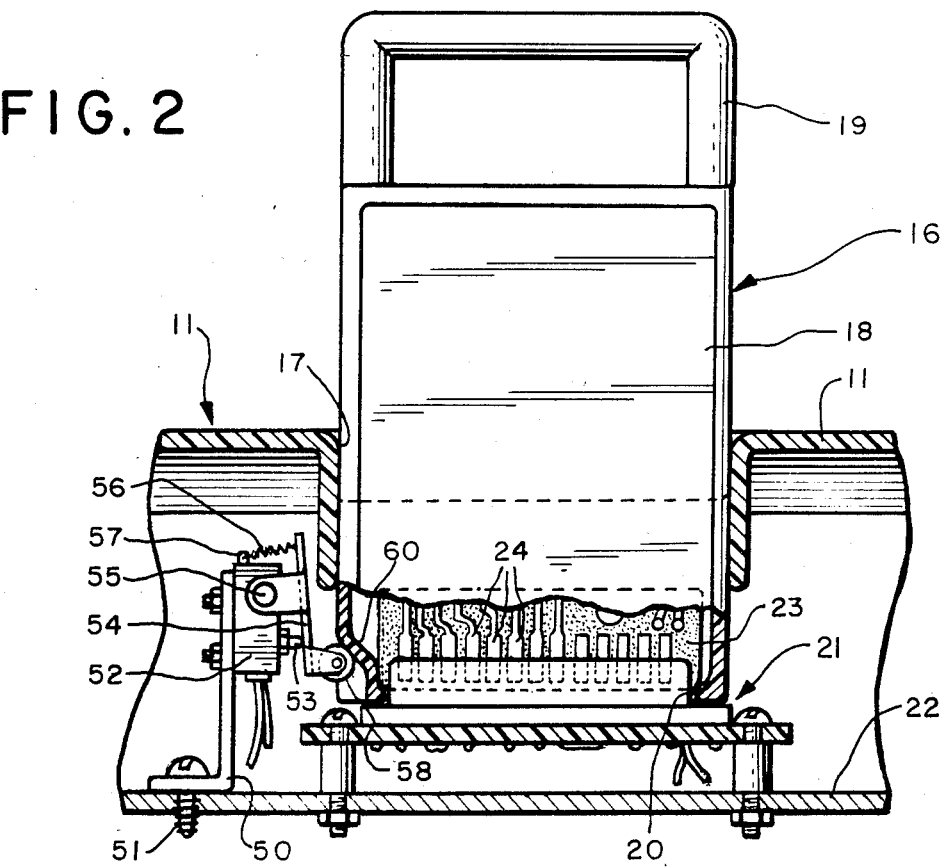
FIG. 2 is a cross-sectional view taken along line 2—2 of the video game unit and cartridge shown in FIG. 1.

As shown in FIG. 2, the plug-in game cartridge 16 comprises a housing 18 fashioned from molded plastic or a similar durable material. A read only memory (ROM) within the housing is factory programmed with a set of digital instructions for generating a particular game format. The game cartridge is generally elongated in form and of rectangular cross-section. One end of the cartridge may be provided with an integrally formed handle portion 19 by which the user can grasp the cartridge during its installation or removal from the video game housing 12. The opposite end of the cartridge is dimensioned so as to fit in opening 17 of the video game housing, and is provided with an opening 20 dimensioned for receiving an electrical connector assembly 21 mounted on the bottom wall 22 of the opening 17.

The ROM and its associated circuitry are installed on a conventional printed circuit board 23 contained within the interior of the game cassette housing 18. One edge of the circuit board 23 extends transversely across the opening 20 formed at the lower end portion of the cassette housing, and is received in a slot provided in the upper surface of socket assembly 21.

To establish electrical communication between the circuitry contained in the video game unit 11 and the game cartridge 16, the lower edge portion of circuit board 23 is provided with a plurality of electrical contact surfaces 24 formed by the conductors of the printed circuit board. Suitable spring contacts located in socket assembly 21 engage the contact surfaces 24 in a known manner to establish electrical connection with circuit board 23.

Figure 3:
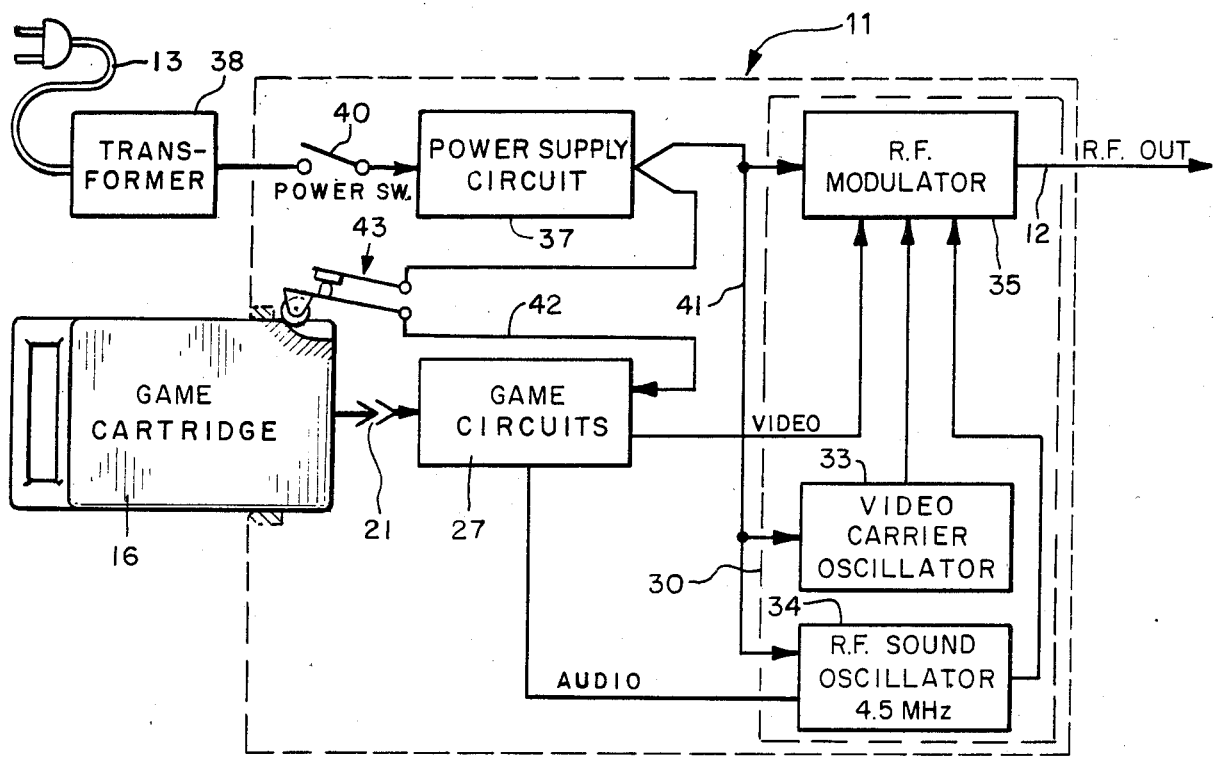
FIG. 3 is a functional block diagram of a video game unit incorporating the invention disclosed herein.

The principal components of video game unit 11 are shown in FIG. 3. As previously developed, the video game unit 11 generates an RF output signal for display on a conventional television receiver. To this end, the digital instructions stored in the game cartridge 16 are supplied to game circuit means 27 within the game unit. The game circuit means include a microprocessor and related digital circuitry for generating an audio signal and a video signal which taken together constitute the video game display.

The RF output signal of the game unit comprises a standard NTSB television signal which can be displayed on a television receiver by tuning the receiver to the appropriate channel (typically channel 3). In accordance with conventional practice, this RF output signal includes an amplitude-modulated video carrier and a frequency-modulated audio carrier generated by an RF signal generator 30 which includes, a video carrier oscillator 33, a 4.5 MHz. sound oscillator 34, and an RF modulator 35, all conventional in construction and operation. Since in a standard NTSB television signal the audio carrier frequency is spaced 4.5 MHz. higher than the video carrier, the sound oscillator 34 operates at a frequency of 4.5 MHz. Audio information contained in the audio signal developed by game circuit 27 is frequency-modulated thereon. In the event that the RF signal is to be received on television channel 3, the video carrier oscillator 33 operates at the video carrier frequency of 61.25 MHz.

The video carrier oscillator output signal is applied to RF modulator circuit 35. Also applied to RF modulator 35 are the video signal generated by the game circuit 27 and the audio subcarrier signal generated by oscillator 34. The RF modulator 35 combines the video carrier and the audio subcarrier signal to generate an audio carrier 4.5 MHz. above the video carrier. If it is desired to display the RF signal on a channel other than channel 3, the frequency of the video carrier oscillator 33 is set to the video carrier frequency of the desired channel.

To provide operating power for the various circuits, the video game unit includes a regulated DC power supply circuit 37. Typically, low voltage alternating current is supplied to this power supply by a transformer 38, which steps down the 120 VAC applied to it through power cord 13. A user-actuable electrical switch 40 may be interposed between the step down transformer 38 and the power supply circuit 37 to provide a means for de-energizing the video game unit. A first conductor means for supplying power from power supply circuit to the video carrier oscillator 33, audio carrier oscillator 34 and RF modulator 35, are provided in the form of a distribution circuit 41.

In order to transfer the software instructions stored in game cartridge 16 to the game circuit means 27, an electrical connection is established between the cartridge and the game circuits by means of electrical connector assembly 21. Typically, several electrical connections are established to provide power to the game cartridge, to supply memory address data to the cartridge, and to supply memory data from the cartridge to the instruction inputs of the game circuit means 27. A multi-conductor "edge" connector of conventional construction may be advantageously utilized to establish these electrical connections.

During normal operation, with the game control unit energized, it is common for voltage to be present on several of the connector contacts. If a cartridge were to be physically removed from the video game unit while the power was on, the resulting switching transients and static discharges could damage the digital circuitry of the game cartridge and the game circuitry.

Figure 4:
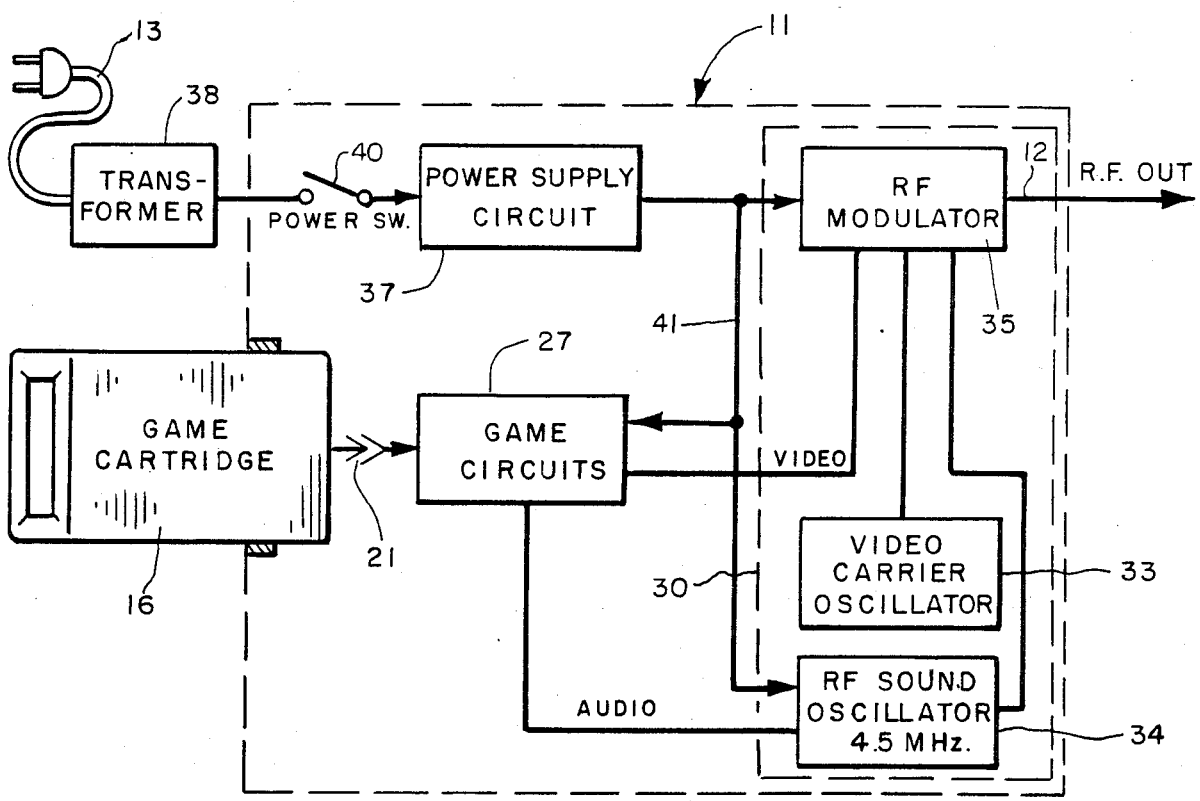
FIG. 4 is a functional block diagram of a conventional video game unit as presently known in the art.

Referring to FIG. 4, in prior art video game units, when the user-actuable power switch 40 was opened to disconnect power to the power supply circuit 37, power was removed from all subcircuits of the game unit, including the video carrier oscillator 33, the audio carrier oscillator 34 and the RF modulator 35. With these circuits de-energized, no RF signal appeared at the output of the game control unit. Consequently, the automatic gain control circuits of the television set to which the game unit was connected increased the gain of the receiver in an attempt to find a useable signal. This in turn led to extreme amplification of the noise present in the receiver, thereby causing the receiver to produce objectionable aural and visual displays.

In accordance with the present invention, video game unit 10 is provided with a second conductor means independently controlled for supplying power to game circuit means 27. Such second conductor means take the form of a distribution bus 42 interconnecting the output of the power supply circuit 37 and the game circuit means 27. Serially disposed within this second conductor means 42 are circuit switch means in the form of a SPST switch assembly 43 responsive to disengaging movement of the removable cartridge 16.

As shown in FIG. 2, the switch assembly 43 is adapted and arranged so that when a game cartridge 16 is inserted in opening 17 (FIG. 2), the switch is actuated to the closed position to supply power to the game circuit means 27 and the game cartridge. When the game cartridge is removed, the spring-actuated switch assembly 43 automatically opens thereby interrupting power to the game circuit means 27. Since the main power switch 40 remains closed during this time, DC voltage continues to be supplied to video carrier oscillator 33, audio carrier oscillator 34 and RF modulator 35 to provide an RF signal at the output 12 of the game unit. This RF signal at the input of the television receiver effectively blanks the audio and video channels, thereby preventing objectionable outputs from the receiver.

Since opening switch assembly 43 removes power from the game circuit means 27, the game cartridge can be removed from and inserted into the video game console without danger of electrically damaging the circuitry of either the game cartridge 16 or the game circuit means 27. In contrast, with the prior art arrangement shown in FIG. 4, the game circuit means 27 can only be de-energized by opening power switch 40, thereby simultaneously de-energizing circuits 33, 34 and 35. This causes loss of the RF output signal and consequent objectionable outputs from the television receiver.

FIG. 2 illustrates one possible construction of switch assembly 43. In this construction, a vertical mounting bracket 50 is attached to the bottom wall of opening 17 by means of a screw fastener 51. A SPST switch 52 is mounted to the vertical surface of the bracket adjacent the left side wall of the game cartridge 16. An actuator pin 53 protrudes from the side of the switch housing and extends toward the game cartridge. Depressing the actuator pin 53 conditions the SPST switch contacts to their closed position. To actuate the actuator pin, the switch assembly is provided with an actuator lever 54 pivotally mounted to the switch housing about a pivot 55. The lower surface of the actuator lever 54 extends over and contacts the end of actuator pin 53. Pivotal movement of the actuator lever 54 in the clockwise direction results in inward motion of the actuator pin 53 to close the switch contacts. A helical spring 56 attached between the upper end of actuator lever 54 and a tab 57 projecting from the top surface of the switch housing biases the actuator lever so that the switch contacts normally remain open. The switch 52 is electrically connected between the power supply circuit 37 and the game circuit means 27 (FIG. 3) so that power is supplied to circuit means 27 when the switch contacts are closed, and is removed when the switch contacts are open.

To provide for closing the switch contacts when a game cartridge is inserted in the video game unit, the lower end of the actuator lever 54 is provided with outwardly extending flanges between which a roller 58 is rotatably mounted. The roller 58 extends outwardly from the outer surface of the actuator lever 54 into the path of the video game cartridge 16 as the cartridge is inserted downwardly into the video game unit 10. The lower left vertical surface of the video game cartridge 16 is provided with an actuator surface 60 positioned to engage the roller 58 as the cartridge descends into socket 17. The actuator surface 60 is formed so that when the game cartridge is fully inserted, the actuator level 54 is deflected away from the game cartridge by reason of roller 58 to condition the switch contacts to the closed position. Upon removal of the cartridge, spring 56 causes the actuator lever 54 to pivot in a counter-clockwise direction, thereby opening the switch contacts.

Since the purpose of the switch 52 is to prevent voltage from appearing at the contacts of socket assembly 21 while the game cartridge 16 is being installed or removed, it is desirable that in removing the cartridge, power be removed from the contacts before they disengage, and while inserting the cartridge, power be re-applied only after the contacts become re-engaged. Accordingly, the switch 52 is preferably located and arranged so that when the cartridge is inserted, lever 54 will not be displaced to a degree sufficient to close the switch contacts until after the time at which the contacts engage the cartridge contact surfaces 24. Similarly, during removal of the cartridge, power will be removed from the socket contacts by reason of the switch contacts opening before the socket contacts disengage the cartridge contacts.

While the embodiment described herein incorporates a SPST switch wherein a protruding pivotable lever engages a recess in the cartridge, it will be appreciated that other forms and mounting arrangements of switches may be incorporated. For example, a switch mounted on surface 22 immediately beneath the game cartridge, and having an upwardly projecting plunger which is depressed as the cartridge is inserted, may be provided.

Furthermore, while in the embodiment described herein the switch means for interrupting the power supplied to the electronic control means are automatically actuated by physical insertion or removal of the game cartridge, it will be appreciated that in other embodiments where automatic interruption of power to the game circuits 27 is not desired, such switch means may be actuated by means other than the presence or absence of a game cartridge. For example, a conventional user-actuable toggle switch can be provided on housing 11 to allow independent de-energization of the game circuit means.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope the invention.

I claim:

1. An interactive electronic video game unit, for producing a radio frequency carrier signal for supplying a gain control signal and audio and video information to a television receiver having an automatic gain control responsive to said radio frequency carrier signal comprising:
   game circuit means for generating an audio signal and a video signal representing a video game in response to a set of video game instructions stored in a removable memory;
   RF signal generating means for generating a radio frequency carrier signal, said signal generating means including means for receiving said audio signal and said video signal from said game circuit means and generating said radio frequency carrier signal modulated therewith;
   power supply means comprising a source of electrical current for supplying said game circuit means and said RF signal generating means;
   first conductor means for coupling said power supply means to said RF signal generating means; and
   second conductor means for coupling said power supply means to said game circuit means, said second conductor means comprising switch means for interrupting said power supplied to said game circuit means, without interrupting said power supplied to said RF signal generating means, whereby said gain control signal is maintainable during interruptions of said power to said game circuit means of said interactive electronic game unit, thereby preventing excessive noise and light generation by said television receiver.

2. An electronic video game unit as defined in claim 1 wherein said switch means is responsive to the position of said removable memory relative to said video game unit.

3. An electronic video game unit as defined in claim 2 wherein said switch means is responsive to disengaging movement of said removable memory prior to the interruption of electrical interconnection with said game circuit means, said switch means interrupting power to said game circuit means upon detection of said disengaging movement.

4. An electronic video game unit as defined in claim 3 wherein said removable memory has an actuator surface formed therein, said switch means being positioned to engage said surface and apply power to said game circuit means after engaging movement of the removable memory has provided electrical interconnection of said removable memory with said game circuit means.

* * * * *